United States Patent
Mersh

(10) Patent No.: US 8,935,681 B2
(45) Date of Patent: Jan. 13, 2015

(54) SOURCE CODE PROTECTION

(75) Inventor: John David Mersh, Bottisham (GB)

(73) Assignees: MStar Semiconductor, Inc. (KY); MStar Software R&D (Shenzhen) Ltd., Shenzhen (CN); MStar France SAS, Issy les Moulineaux (FR); MStar Semiconductor, Inc. (TW)

( * ) Notice: Subject to any disclaimer, the term of this patent is extended or adjusted under 35 U.S.C. 154(b) by 1967 days.

(21) Appl. No.: 11/664,431

(22) PCT Filed: Sep. 29, 2005

(86) PCT No.: PCT/GB2005/003735
§ 371 (c)(1),
(2), (4) Date: Sep. 10, 2008

(87) PCT Pub. No.: WO2006/035227
PCT Pub. Date: Apr. 6, 2006

(65) Prior Publication Data
US 2011/0078669 A1    Mar. 31, 2011

(30) Foreign Application Priority Data
Sep. 30, 2004  (GB) ................................ 0421774.1

(51) Int. Cl.
*H04L 9/32*  (2006.01)
*G06F 21/12*  (2013.01)
(Continued)

(52) U.S. Cl.
CPC .......... *G06F 21/121* (2013.01); *H04L 63/0428* (2013.01); *G06F 21/10* (2013.01); *H04L 9/32* (2013.01); *H04L 9/0822* (2013.01); *H04L 9/3247* (2013.01); *G06F 2221/2107* (2013.01)
USPC ........................................ 717/149; 713/165

(58) Field of Classification Search
CPC . H04L 63/0428; H04L 9/0822; H04L 9/3247; H04L 9/32
USPC .............. 717/1, 110, 149; 713/189, 176, 172, 713/190, 201, 165
See application file for complete search history.

(56) References Cited

U.S. PATENT DOCUMENTS 6,643,775 B1 * 11/2003 Granger et al. ............... 713/190
7,515,717 B2 *  4/2009 Doyle et al. ................... 380/277
(Continued)

FOREIGN PATENT DOCUMENTS

EP    0677 949 A2   10/1995
EP    0 704 785 A2   4/1996
(Continued)

OTHER PUBLICATIONS

Watanabe, T., "Message File Protection System," Patent Abstract of Japan, JP No. 3044750, Feb. 26, 1991.
(Continued)

*Primary Examiner* — Jonathan C Teixeira Moffat
*Assistant Examiner* — Lynda Dinh
(74) *Attorney, Agent, or Firm* — Edell, Shapiro & Finnan, LLC

(57) ABSTRACT

A method comprising encrypting an original plain text file and making it available to a user as a protected file, and issuing to said user a user program and a user license to enable said user to decrypt the protected file and view an image of the original file while preventing the image of the original file from being copied to any file, other than as a further protected file. The image is preferably stored in a memory not backed up to the computer swap file. Preferably, the user program comprises an editor program and the user saves editorial changes to the original image in an encrypted difference file, separate from the original file. Both files are then used to re-create the edited image using the editor program and user license. The user program may comprise any computer tool including compilers. Alternatively, the user program comprises a special editor program incorporating an obfuscator which generates obfuscated code from the image generated by the editor program, so that this is only intelligible to a compiler or similar tool capable of converting the obfuscated code to an object file.

17 Claims, 1 Drawing Sheet

(51) Int. Cl.
  *H04L 29/06* (2006.01)
  *G06F 21/10* (2013.01)
  *H04L 9/08* (2006.01)

(56) References Cited

U.S. PATENT DOCUMENTS

| | | |
|---|---|---|
| 2002/0067833 A1 | 6/2002 | Han et al. |
| 2002/0077986 A1* | 6/2002 | Kobata et al. ............ 705/52 |
| 2002/0099947 A1* | 7/2002 | Evans ...................... 713/193 |
| 2002/0144153 A1* | 10/2002 | LeVine et al. ............ 713/201 |
| 2003/0041243 A1* | 2/2003 | Olguin et al. ............ 713/172 |
| 2003/0046268 A1* | 3/2003 | Hirabayashi ............... 707/1 |
| 2003/0088783 A1* | 5/2003 | DiPierro .................. 713/189 |
| 2003/0221128 A1 | 11/2003 | Kobata et al. |
| 2004/0177321 A1* | 9/2004 | Brown et al. ............ 715/513 |
| 2005/0132208 A1* | 6/2005 | Hug et al. ............... 713/189 |
| 2005/0235163 A1* | 10/2005 | Forlenza et al. ........ 713/193 |
| 2006/0107325 A1* | 5/2006 | Kanestrom et al. ...... 726/26 |

FOREIGN PATENT DOCUMENTS

| | | |
|---|---|---|
| EP | 0 709 760 A2 | 5/1996 |
| WO | WO 00/46653 | 8/2000 |

OTHER PUBLICATIONS

Per Cederqvist, et al., "Version Management with CVS for CVS 1.12.9," pp. 1-184 and pp. i-viii, (Jun. 9, 2004).

* cited by examiner

SOURCE CODE PROTECTION

CROSS REFERENCE TO RELATED APPLICATIONS

This application is a national phase application based on International Application No. PCT/GB2005/003735, filed Sep. 29, 2005, which claims the priority of Great Britain Patent Application No. 0421774.1, filed Sep. 30, 2004, the contents of all of which are incorporated herein by reference.

TECHNICAL FIELD

This invention relates to a method of protecting an original plain text file, and a computer tool to access an original plain text file that has been protected.

The invention is concerned with plain text file, especially computer source code, and their distribution to customers. The reason why software developers supply products in the form of source code, for example, in a high-level language such as C or C++, is that this can be readily adapted by their customers to suit their particular applications. However, in distributing source code in this manner, the developer loses control of subsequent use including copying by their customers and third parties obtaining the code from their customers, and the developer is then wholly dependent on legal enforcement of contracts and licenses to protect their intellectual property rights.

Attempts have been made to overcome this problem by providing conditional access by a customer to the source code by encrypting the source code and generating a software key to decrypt the encrypted source code, and providing the software key to an escrow holder to issue to the customer under specified conditions. US Patent application US2002/0067833A1 discloses an example of such a method of distributing source code.

DISCLOSURE OF THE INVENTION

An object of the invention is to provide a method and means whereby a plain text file can be protected against illegal copying or use once it has been distributed to an authorised user.

This is achieved according to the invention by providing a method comprising encrypting an original plain text file and making it available to a user as a protected file, and issuing to said user a user program and a user license to enable said user to decrypt the protected file and view an image of the original file whilst protecting the image of the original file from being copied to any file, other than as a further protected file, and arranging that the user program comprises an editor program that allows the user to edit the image of the original file and to save the changes made to the original file in an encrypted form, separate from the original file.

Thus access to the plain text file is granted by a combination of a user license and a special user program which makes use of the user license and protected file to re-create, in the memory of a computer, an image of the original file, which can be displayed and edited. This image is preferably protected against copying by arranging that the memory in which it is stored is not backed up to the computer swap file so that it cannot be found by programs that might read the image file.

The user re-creates the edited image of the original file from the protected file and the difference file using the editor program and user license. If desired, the user can re-edit the edited image and then save the changes to the re-edited image in a second difference file, which is encrypted and is kept separate from the original file and the difference file. Subsequently, the user uses the editor program and user license to re-create the most recent edited image from the original file and as many difference files as are involved.

The advantage of storing changes to the original file as a difference file or multiple difference files is that this is, an auditable arrangement in which the ownership of each file can be readily identified as with the originator of each, and this identification is not lost with successive edit processes.

Also, if each of the difference files is encrypted using the same or a separate license to that of the protected file, then each of these is similarly protected.

The user program preferably has only limited copying capabilities that allow data to be copied only into other protected files, a typical data copying capability being known as "cut and paste".

Portions of the original file may be marked as non-editable or invisible so that they can never be removed by the editor program, and thus will always be present to allow identification of the original file for licensing or other purposes or to restrict the use of the original file to that defined by the user license.

The user program may comprise any computer tool needed by a user to access the original plain text, and includes compilers, version or configuration management tools and source level debuggers. Where multiple tools are required to access plain text source code and to generate executable code from it, each of the tools will require the protection features of the invention.

However, in an alternative embodiment of the invention, the user program comprises a special editor program incorporating an obfuscator which generates obfuscated code from the image generated by the editor program, thereby preventing access to the source code other than by a compiler or similar tool which is capable of converting the obfuscated code to intelligible object code which is identical to that which would have been generated if the compiler had had access to the original source code.

Thus, according to another aspect, the invention consists in a computer tool for a user to access an original plain text file which has been protected by being encrypted in a protected file, the tool being adapted to decrypt the protected file once authorised by a user license issued by an authority responsible for the protected file so as to produce an image of the original plain text file whilst protecting the image of the original file from being copied to any file, other than as a further protected file, and an editor program that edits the image of the original file and then saves the changes made to the image of the original file in an encrypted form, separate from the original file.

The tool preferably comprises an editor program and may be a special editor program including an obfuscator as already described above.

DESCRIPTION OF THE DRAWINGS

The invention will now be described by way of example with reference to the accompanying drawings.

EMBODIMENTS OF THE INVENTION

Figure 1:
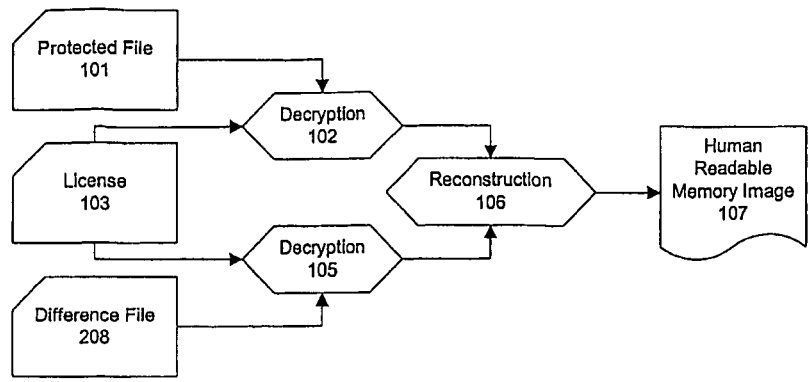
FIG. 1 is a block diagram illustrating steps in a method according to the invention for allowing a user access to source code in a protected file including any changes to the source code.

Referring to FIG. 1, the protected file 101 consists of a plain text file, such as source code, which is encrypted using a fast symmetric key algorithm, with the key stored at the beginning of the file in an encrypted form using public key cryptography. The whole file 101 is then protected using a digital signature algorithm.

The protected file 101 is distributed by the source code owner to a user, together with a user license 103, which incorporates the key used in the public key cryptography to protect the file 101. The license 103 is distributed using either the public key infrastructure PKI or a similar certificate-based mechanism.

The user receiving the protected file 101 and user license 103, is provided with a special computer tool to access the source code in the protected file.

The tool first checks its own validity by checking a digital signature which is stored within its own executable file to ensure it has not been modified. It then opens the license 103 and determines if it is entitled to run.

If the tool is entitled to run, then it opens the protected file 101. It then uses two decryption engines (102, 105) to generate data streams which represent the decrypted contents of the protected file and license. These streams are then fed to a reconstruction engine 106 which combines the two streams to generate a human readable image 107. This image is held in the memory of a computer which is not backed up to the computer swap file so that the image cannot be found by other programs on the computer.

The human readable image 107 contains all of the source code lines along with flags indicating whether lines are invisible or non-editable.

Figure 2:
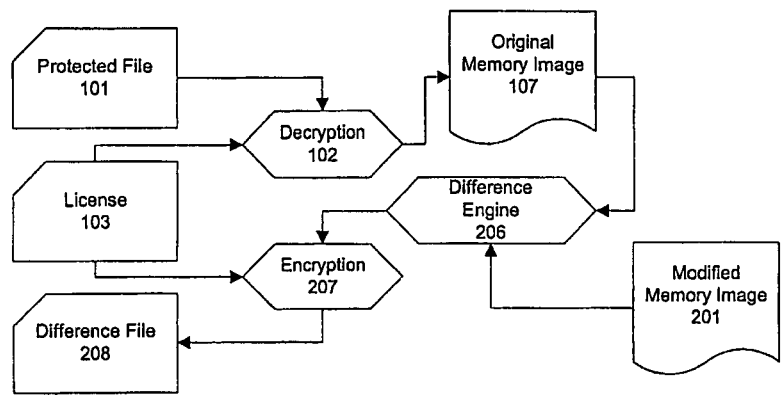
FIG. 2 is a block diagram illustrating steps in a method according to the invention for allowing a user to access source code in a protected file and to save changes made to an image of the source code in a difference file, separate from the protected file.

The computer tool includes an editor that allows the image 107 to be edited, and this is illustrated in FIG. 2 in which an edited image 201 is generated from the original image 107. The tool then allows the user to save the edited image 201 in terms of the differences compared with the original image 107. This is accomplished by a differences engine 206 which compares the images 107 and 201 and determines a set of differences which will subsequently allow the edited image 201 to be created from the original image 107.

This set of differences is then passed to an encryption engine 207 which uses a public key pair from the license 103 to create a difference file 208. This public key pair used to encrypt the difference file is preferably different to the public key pair used to encrypt the protected file 101.

The difference file 208 is separate from but associated with the protected file 101 for use in creating the edited image, thereafter.

If, as shown in FIG. 1, the difference file 208 is associated with the protected file 101 when it is accessed, then the reconstruction engine 106 receives a series of further instructions from the difference file 208, and lines of instructions are copied from either the protected file 101 or the difference file 208 as appropriate, to create the edited image 201 in place of the original image 107.

Figure 3:
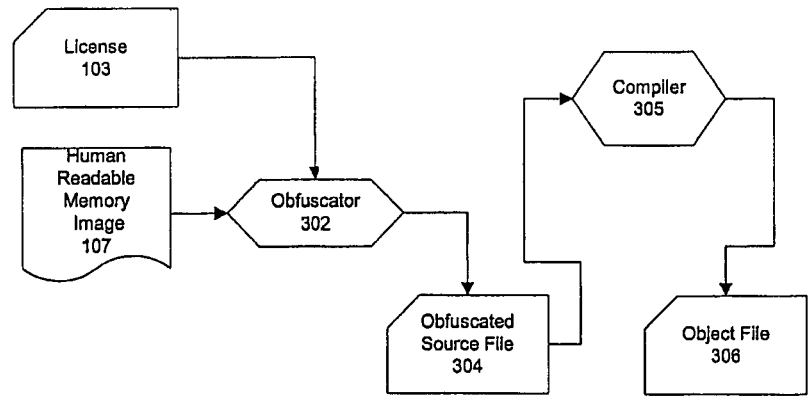
FIG. 3 is a block diagram illustrating further steps in the method of FIG. 1 for allowing a user access to source code including obfuscation of the source code and passing of the obfuscated file to a compiler to produce an object file.

FIG. 3 shows the process of compiling a protected source file using a source code obfuscator 302.

The first operation performed by the obfuscator 302 is to use the mechanism described in FIG. 1 to build the human readable image 107 based on the license 103.

Once the image 107 is available, then the obfuscator 302 can process this to generate the obfuscated source file 304. The process of obfuscation involves the removal of all human intelligible information from the file and is a well known technique (see for example Collberg et. al. U.S. Pat. No. 6,668,325). Obfuscation typically involves the removal of all comments from the source code; replacement of human-meaningful variable names with randomly-selected names and; modification of formatting to make the code difficult for humans to read.

Once the obfuscated source file 304 is available it can be read by the conventional compiler 305 which will produce an object file 306 identical to that which would have been produced by compiling the human readable image 107.

The invention claimed is:

1. A method of protecting an original plain text file which comprises the steps of:
  a) encrypting the original plain text file and making the original plain text file available to a user as a protected file;
  b) issuing to said user a user program and a user license, operable on a computer, to enable said user to decrypt the protected file and view the original plain text file as an image of the original plain text file whilst protecting the image of the original plain text file from being copied to any file, other than a further protected file, wherein the image of the original plain text file cannot be found by other programs on the computer; and
  c) arranging that the user program comprises an editor program that allows the user to (i) edit the image of the original plain text file to create an edited image and (ii) to save changes made to the image of the original plain text file in an encrypted form, separate from the original plain text file, wherein the editor program enables the use to create the edited image of the original plain text file from the protected file and a difference file using the editor program and user license,
  wherein, before allowing the user to view or edit the image of the original plain text file, the user program checks its own validity by checking a digital signature to ensure the user program has not been modified, and
  wherein parts of the original plain text file are marked as non-editable, and the editor program prevents such parts being edited so that they will always be present in any image created from the original plain text file and any difference file or files.

2. The method as claimed in claim 1 in which changes to the image of the original plain text file are saved by a difference engine which re-opens the protected file using said user license and compares the image of the original plain text file with the edited image to produce the difference file which is saved.

3. The method as claimed in claim 1 in which the user re-edits the edited image and then saves the changes to the re-edited image in a second difference file, which is encrypted and is kept separate from the original plain text file and the difference file.

4. The method as claimed in claim 1 in which said changes are encrypted by the editor program using said user license or a different license key.

5. The method as claimed in claim 1 in which said changes are stored in said protected file or in the difference file related to the protected file.

6. The method as claimed in claim 1 in which parts of the original plain text file are marked as invisible, and the editor program prevents such parts from being displayed in any image created from the original plain text file and any difference file or files.

7. The method as claimed in claim 1 in which the user program comprises an obfuscator that generates from the image of the original plain text file an obfuscated output file which is intelligible to a specific software tool only.

8. The method as claimed in claim 7 in which the specific software tool is a compiler.

9. The method as claimed in claim 1 in which the original plain text file comprises source code.

10. A computer tool, stored in a non-transitory medium, for a user to access an original plain text file which has been protected by being encrypted in a protected file, the computer tool being adapted to decrypt the protected file once authorized by a user license issued by an authority responsible for the protected file to produce an image of the original plain text file whilst protecting the image of the original plain text file from being copied to any file, other than a further protected file, wherein the image of the original plain text file cannot be found by other programs on the computer, and an editor program that (i) edits the image of the original plain text file to create an edited image of the original plaint text file and then (ii) saves changes made to the image of the original plain text file in an encrypted form, separate from the original plain text file, wherein the computer tool creates the edited image of the original plain text file from the protected file and a difference file using the editor program and user license, wherein, before allowing to produce the image of the original plain text file or to edit the image of the original plain text file, the computer tool checks its own validity by checking a digital signature to ensure the computer tool has not been modified, and wherein parts of the original plain text file are marked as non-editable, and the editor program prevents such parts being edited so that they will always be present in any image created from the original plain text file and any difference file or files.

11. The computer tool as claimed in claim 10 which comprises a difference engine which re-opens the protected file using said user license and compares the image of the original plain text file with the edited image to produce the difference file which is saved.

12. The computer tool as claimed in claim 10 which encrypts said changes using said user license or a different license key.

13. The computer tool as claimed in any one of claims 10 to 12 which stores said changes in said protected file or in the difference file related to the protected file.

14. The computer tool as claimed in claim 10 which re-edits the edited image and then saves changes made to the re-edited image in a second difference file, the tool encrypting the re-edited second difference file and keeping this separate from the original plain text file and the difference file.

15. The computer tool as claimed in claim 10 in which parts of the original file are marked as invisible, and the editor program prevents such parts from being displayed in any image created from the original plain text file and any difference file or files.

16. The computer tool as claimed in claim 10 in which a user program comprises an obfuscator that generates from the image of the original plain text file an obfuscated output file which is intelligible to a specific software tool only.

17. The computer tool as claimed in claim 16 in which the specific software tool is a compiler.

\* \* \* \* \*